United States Patent Office 3,245,257
Patented Apr. 12, 1966

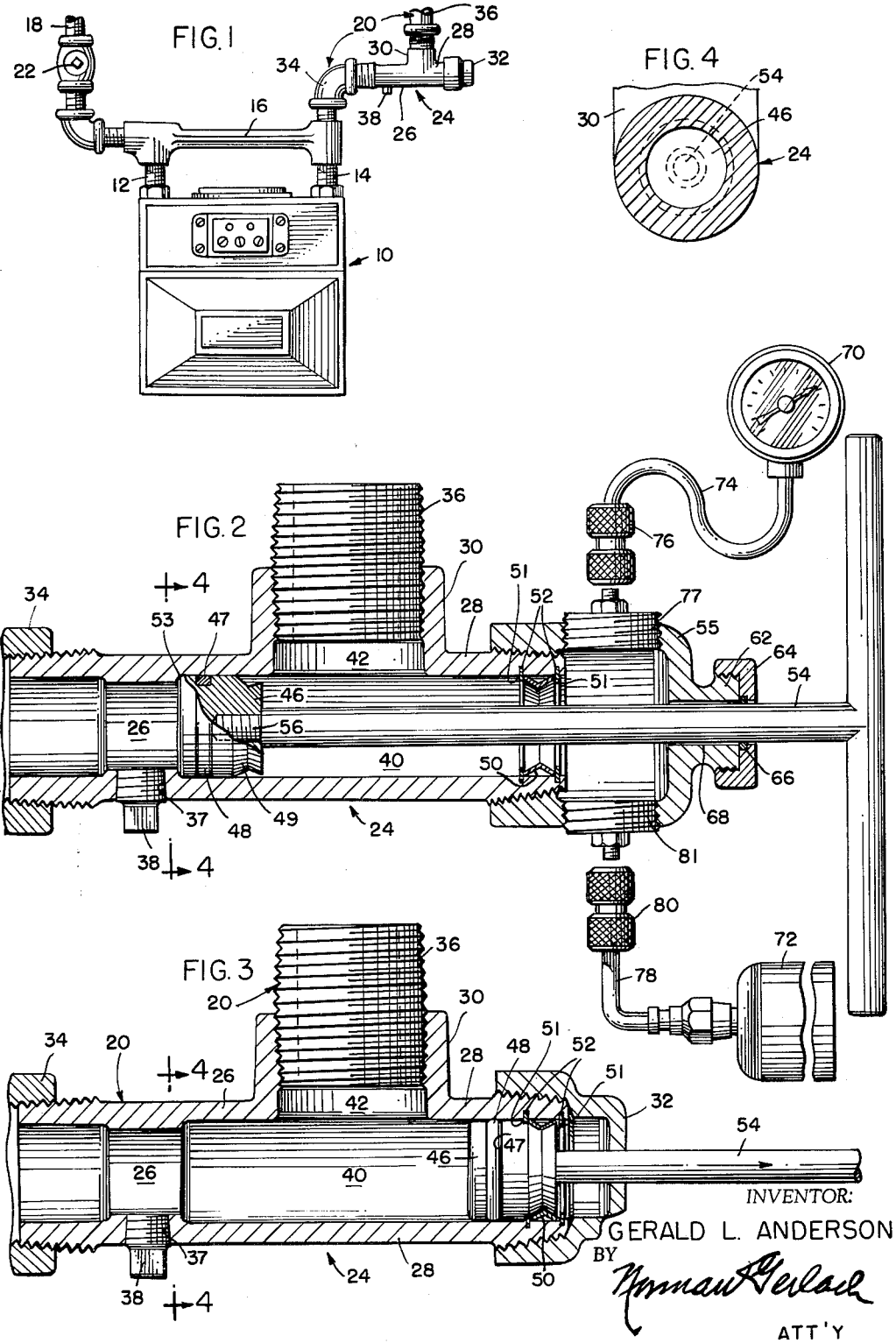

3,245,257
GAS METER CHANGE-OVER FITTING
Gerald L. Anderson, Rockford, Ill., assignor to Eclipse Fuel Engineering Co., Rockford, Ill., a corporation of Illinois
Filed Nov. 13, 1963, Ser. No. 323,322
3 Claims. (Cl. 73—201)

The present invention relates generally to gas meter change-over fittings and has particular reference to a new and improved fitting which makes possible the periodic changing of the associated domestic or commercial gas meter without interruption of service.

There at the present time upon the market various devices by means of which gas meters may be substituted or replaced without interrupting service. One such device is disclosed in, and forms the subject matter of, co-pending United States patent application Serial No. 322,951, filed on November 12, 1963 by Thomas R. Howarth and entitled "Gas Meter Change-Over Fitting." The present invention is designed as an improvement on the device of such patent application.

Briefly, the device of the aforementioned Howarth patent application comprises a change-over fitting which is capable of being operatively and permanently installed at any point in the service line leading from the outlet side of the gas meter, and when so installed, is capable of being manipulated so that it may assume an inoperative condition wherein normal flow of gas from the meter and through the service line will obtain, or so that the connection leading from the outlet side of the meter is closed off, while at the same time, the service line is opened to a separate and portable source of gas under pressure, such source serving as a temporary gas supply through the service line while meter substitution or change-over operations are in progress. By closing off the connection leading from the outlet side of the meter, escape of pressurized gas to the atmosphere when the meter is removed from its fittings is prevented and the available pressurized gas is directed solely to the service line which at no time is either shut off or bled to atmosphere. After the meter substitution or change-over has been effected, the shut-off cock at the inlet side of the gas meter is first opened, after which the gas meter change-over fitting is restored to its inoperative condition, at which time the outlet side of the gas meter is again connected to the service line while the supply of pressurized gas from the separate and portable source is automatically discontinued. Such source of pressurized gas may then be disconnected from the change-over fitting and taken away by the employee of the gas service company. It is to such a gas meter change-over fitting that the present invention specifically relates.

According to the present invention, the change-over fitting embodies a two-way valve having dual inlets and a common outlet, together with a single non-corrosive movable valve element which is capable of selectively closing off either inlet. The movable valve element is axially slidable in a linearly straight internal bore in the fitting and the ends of the bore provide the two inlets, while the medial region of the bore provides the outlet. Thus, when the valve element is disposed adjacent to one end of the bore, communication is established between the other end of the bore and the outlet. When the valve element is disposed adjacent to said other end of the bore, communication is established between the one end of the bore and the outlet. By connecting the one end of the bore to the meter, the other end to the portable source of pressurized gas, and the outlet to the service line leading to the various gas-consuming appliances, the desired change-over operations are available.

The end of the bore which is adapted to be connected to the portable source of pressurized gas is normally closed off by a closure cap. When it is desired to effect a given change-over operation, the cap is removed and in its place is substituted a combined guide and closure cap having associated therewith a slidable manually-operable plunger which, when the threaded inner end thereof is threaded into a socket in the slidable valve element, thus captures the valve element so that by pushing or pulling the plunger, the valve element may be shifted between its two extreme positions. The present invention is concerned with a novel anti-torque reaction means for preventing rotation of the valve element within the bore so that initial threaded engagement between the plunger and valve element may be effected, and also so that unthreading of the plunger from the valve element after a given change-over operation has been completed may be accomplished. This anti-torque reaction means assumes the form of a snap ring which is positioned to receive the valve element therein when the latter is in one extreme position thereof, i.e., the normal operative position of the valve element, and which makes frictional engagement with the wall of the bore in which the valve element is mounted and with the valve element, thus holding the latter against rotation while the adjacent end of the plunger is being threaded into or turned out of the valve element. Still further, according to the present invention, means are provided whereby the snap ring is accessible for removal from the bore in the event of such a remote contingency that frictional forces between the snap ring and the valve element have deteriorated to such an extent that the snap ring is no longer effective to retain the valve element.

The present invention is also concerned with the provision of a means for purging a newly-installed gas meter of any residual entrapped air which may be present in the meter before normal resumption of gas service is effected.

The provision of a gas meter change-over fitting of the character briefly outlined above being the principal object of the present invention, general objects of the invention are substantially the same as those set forth in aforementioned co-pending patent application Serial No. 322,951, such objects including the provision of a change-over fitting which is virtually tamper-proof by reason of the fact that it embodies no rotary valves which could be manipulated by the consumer; which may be located at a point remote from the meter where it is inaccessible to the consumer; and which has no connection to the gas main ahead of the meter so that no gas whatsoever, other than a source of outside pressurized gas, is available for illegal gas conversion by the consumer.

In the accompanying single sheet of drawings forming a part of this specification, one illustrative embodiment of the invention has been shown.

In this drawing:

FIG. 1 is a front elevational view of a meter installation embodying the change-over fitting of the present invention;

FIG. 2 is a sectional view taken substantially centrally and longitudinally through the change-over fitting of the present invention and showing the same in its inoperative condition;

FIG. 3 is a sectional view similar to FIG. 2, but showing the change-over fitting in its operative condition; and FIG. 4 is a sectional view taken on the line 4—4 of FIG. 3.

Referring now to the drawings in detail and in particular to FIG. 1 wherein a gas meter installation embodying the change-over fitting of the present invention has been illustrated, a conventional gas meter 10 having an inlet connection 12 and an outlet connection 14 is suspended from a standard or conventional solid meter bar 16. The meter inlet connection 12 is connected by a pipe connection 18 to a gas main (not shown). The meter outlet connection 14 is connected to a composite gas service line 20. The pipe connection 18 has interposed therein a shut-off cock 22, and this cock, when closed, shuts off the supply of gas from the gas main to the meter and, consequently, to the service line 20. The change-over fitting of the present invention has been designated in its entirety by the reference numeral 24, and it is operatively interposed in the service line 20.

The change-over fitting 24 is generally in the form of a T and comprises two aligned inlet legs 26 and 28 and a single upstanding medial outlet leg 30 at right angles to the inlet legs. In the illustrated form of the fitting 24, the inlet legs 26 and 28 are provided with external screw threads, while the outlet leg is provided with internal screw thread, thus accommodating the illustrated complementary pipe sections which form parts of the service line 20 and to which the legs 26 and 30 of the fitting 24 are operatively connected. It is contemplated that the legs 26 and 30 may be provided with either external or internal screw threads as required to accommodate complementary pipe sections which may be encountered in different forms of composite service lines. The leg 28, however, will preferably be formed with an external screw thread as shown in order to accommodate reception thereover of a closure cap 32, the function of which will be made clear presently. The change-over fitting 24 is adapted to be connected in the service line 20 in such a manner that the leg 26 communicates directly with the meter outlet connection 14, while the leg 30 communicates with that portion of the service line that leads to the various gas outlets of the building installation to which gas appliances are connected. In the illustrated environment of the change-over fitting 24, the inlet leg 26 is connected to an elbow 34, while the outlet leg 30 is connected to a pipe section 36. The leg 26 is provided with a threaded hole 37 in the wall thereof, the hole being normally closed by a bleed-off or purge plug 38, the plug being provided for air-bleeding purposes, as will be described in greater detail subsequently.

The two aligned legs 26 and 28 establish an elongated horizontal bore 40 through the fitting and the vertical leg 30 establishes a vertical bore 42 in communication with the central portion of the bore 40. A valve plug 46 is slidable in opposite directions within the bore 40 and is movable between an inoperative position wherein it closes off the leg 28 as shown in FIG. 2 and an operative position wherein it closes off the leg 26 as shown in FIG. 3.

The valve plug 46 is of cylindrical design and is provided in the medial regions thereof with an annular groove 47 which receives therein an elastomeric O-ring 48, the latter making sliding contact with the cylindrical wall of the bore 40. The end of the valve plug 46 which opposes the leg 28 is formed with a shallow V-shaped annular detent groove 49 which is designed for frictional retention in a detent element in the form of a complementary-shaped snap ring 50 of spring steel and V-shaped cross section, such snap ring being disposed adjacent to the remote end of the leg 28 and being held in position against axial shifting by a pair of split rings 51 in grooves 52.

In its inoperative position, the valve plug 46 is frictionally retained within the snap ring 50 against both rotational and axial shifting movement as shown in FIG. 2, while in its operative position, the valve plug bears against an internal stop shoulder 53.

The valve plug 46 is capable of being manipulated between its operative and inoperative positions by means of a tool assembly including an operating rod 54 and a cup-shaped guide cap 55, the rod 54 extending through and being longitudinally slidable in the guide cap, and the latter being capable of threaded reception on the leg 28 when the previously-mentioned closure cap 32 is removed. The inner end of the operating rod 54 is provided with a reduced externally-threaded portion 56 for threaded reception in a threaded socket 58 in the adjacent end of the valve plug 46. The outer end of the operating rod 54 is provided with a transverse handle bar 60 to facilitate manipulation of the rod.

The guide cap 55 is provided on its cross wall with an axially extending, externally threaded boss 62 over which there is threadedly received an internally threaded sealing cap 64 carrying an O-ring 66. The latter, when the sealing cap is in place on the boss 62 (see FIG. 3), seals the opening 68 in the cross wall of the guide cap 54, i.e., the opening, through which the operating rod 52 extends. The opening 68 affords a slight clearance for the operating rod 52 in order to prevent binding when the rod is manipulated, as hereinafter described.

The guide cap 55, in addition to its function of affording a guide for the operating rod 54, also functions as a fitting for connecting the cap to a pressure gauge 70 and to a portable source of gas under pressure, such, for example, as the pressure cylinder 72. Connection may be made to the pressure gauge 70 through a flexible line 74 having a quick release connection 76 for attachment to a tubular connection 77 which is connected to and extends through the cylindrical wall of the guide cap 55, while connection may be made to the pressure cylinder 72 through a flexible line 78 having a similar quick release connection 80 for attachment to a tubular connection 81 which is connected to and extends through the cylindrical wall of the guide cap 54.

The operation of the above-described gas meter change-over fitting 24 is such that when initially installed in a service line such as the service line 20 with the valve plug 46 disposed in the leg 28 and seated within the snap ring 50, gas may flow from the pipe connection 18 through the shut-off cock 22, the meter inlet connection 12, the meter 10, the meter outlet connection 14 and from thence through the changer-over fitting 24 by way of the legs 26 and 30 to the portion of the service line 20 that leads to the various gas outlets. The closure cap 32 is normally maintained in position over the leg 28 to prevent unauthorized access to the valve plug 46. The internal gas pressure within the bore 40 will tend to maintain the valve plug 46 in its extreme position within the snap ring 50.

When it is necessary to remove the meter 10 for purposes of replacement, repair, or for any other reason whatsoever, the employee of the gas service company will first remove the closure cap 32 and thus expose the threaded socket 58. Then, with the socket 58 in full view of the service employee, the threaded inner end 56 of the operating rod 54 is caused to be threadedly received within the socket 58 utilizing the handle bar 60 for torque application, and thereafter, the guide cap 55 with its attached sealing cap 64 will be slid along the guide rod and threadedly received on the external screw thread on the outer end region of the leg 28. During threading of the inner end of the operating rod 54 into the socket 58, reaction against the torque which is applied to the plug 46 by the operating rod 54 is assimilated by the snap ring 50 which fits tight against the wall of the bore 40 so that the plug is held against turning movement within the leg 28. The quick release connection 76 for the pressure gauge 70 and the quick release connection 80 for the pressure cylinder 72 are then applied to their respective connectors on the cylindrical side wall of the guide cap 54, in the order named, after which the service employee will push the operating rod to the left as viewed in FIGS. 2 and 3 so that the valve plug 46 will become dislodged from its sealing position within the leg 28 and slid along the bore 40 so that it enters the leg 26 and bears against the stop shoulder 53. Dislodgement of the valve plug 46 from the leg 28 will open the leg 30 to communication with the leg 28 so that pressurized gas emanating from the pressure cylinder 72 will flow through the line 78, the quick release connection 80, the connector 81, the guide cap 55, the leg 28 and the leg 30 to the portion of the service line 20 that leads to the gas outlets. The supply of pressurized gas to and through the service line 20 is instantaneous and, in fact, it precedes by a slight fraction of a second the blocking-off of gas issuing from the outlet fitting 14 of the meter at the time that the valve plug enters the leg 26 so that gas pressure in the service line is maintained, thus insuring that no automatic appliance or other utility then in use is deprived of gas. Pilot lights of automatic appliances not in use will thus remain ignited.

It is to be noted at this point that the effective longitudinal extent of the valve plug 46 is greater than the diameter of the vertical bore 42 so that during movement of the valve plug in either direction across this bore, communication between the bores 42 and 40 will not be completely cut off. Because of this, there will at no time be a momentary closing-off of the bore 42 and a continuous supply of gas to the bore 42 from either the gas source or the pressure cylinder 72 will at all times obtain.

Preferably, the pressure of gas within the pressure cylinder 72 is greater than line pressure in the gas main so that as soon as the valve plug 46 enters the leg 26, the unbalanced pressure on opposite sides of the valve plug will maintain the plug seated against the stop shoulder 53.

After the operating rod 52 has been pushed to the left as previously described and the valve plug 46 has entered the leg 26, the gas shut-off cock 22 may then be closed to shut off the supply of gas to the meter 10 and the latter may then be detached from the meter bar 16 and a replacement meter installed in its place. During such time as the meter bar 16 is devoid of a meter, the plug 46 closes off the leg 26 and prevents escape of pressurized gas emanating from the pressure cylinder 72 from escaping to atmosphere through said leg 26.

After the replacement meter has been operatively installed on the meter bar 16, a reversal of the above-outlined procedure is resorted to to restore the service line to its normal operating condition. This reversal of procedure includes opening of the shut-off cock 22, loosening the purge plug 38 to bleed air from the newly-installed meter, retightening the purge plug 38, pulling the operating rod 54 to the right, as viewed in FIGS. 2 and 3, to restore the valve plug 46 to the leg 28, removing the guide cap 55 and its adjuncts including the operating rod 54, unthreading the inner end of the rod from the socket 58, and finally reapplying the closure cap 32 to the leg 28 of the change-over fitting 24. With the valve plug 46 in the leg 28, communication between the legs 30 and 26 is again established so that, upon opening of the shut-off cock 22, normal gas service is restored and measured by the meter 10.

The invention is not to be limited to the exact arrangement of parts shown in the accompanying drawing or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. A gas meter change-over fitting of the character described and designed for connection in a service line leading from the outlet of a gas meter, said fitting comprising a T having first and second aligned inlet legs presenting a common cylindrical bore therethrough, and a medial outlet leg presenting a lateral cylindrical bore intersecting the common bore, said first inlet leg being adapted for connection to the meter outlet, said outlet leg being adapted for connection to a portion of the service line leading to a service outlet, a generally cylindrical valve plug slidably disposed in said common bore and movable between an inoperative position wherein it is disposed in and seals off the second inlet leg thus establishing communication between the first inlet leg and the outlet leg, and an operative position wherein it is disposed in and seals off the first inlet leg thus establishing communication between the second inlet leg and the outlet leg, a guide cap removably received over the outer end of the second inlet leg, an operating rod projecting through and slidable in said guide cap, the inner end of said operating rod being threaded, said valve plug being formed with a threaded socket therein for removable reception of the threaded end of the operating rod, and detent means disposed within said common cylindrical bore and effective between the wall of said latter bore and the valve plug to yieldingly maintain the valve plug in its inoperative position within the second inlet leg and prevent rotation of the valve plug during threaded reception and removal of the operating rod in and out of said threaded socket, and means for introducing gas under pressure to the interior of said guide cap.

2. A gas meter change-over fitting as set forth in claim 1 and wherein said detent means comprises a snap ring adapted to receive the valve plug therein and having a frictional fit within said common cylindrical bore, said snap ring being disposed within the bore adjacent to said outer end of the bore and having an inner surface designed for frictional engagement with the outer surface of the valve plug when the latter is received within the snap ring.

3. A gas meter change-over fitting as set forth in claim 1 and wherein said detent means comprises a snap ring adapted to receive the valve plug therein and having a frictional fit within said common cylindrical bore, said snap ring being of wide angle V-shape in radial cross section, thus presenting a wide angle internal bead, said snap ring being disposed within the bore adjacent to said outer end of the bore, said valve plug being formed with a correspondingly shaped wide angle V-groove in the outer cylindrical surface thereof and designed for frictional engagement with said internal bead when the valve plug is received within the snap ring.

References Cited by the Examiner

UNITED STATES PATENTS

| | | | |
|---|---|---|---|
| 3,148,690 | 9/1964 | Petersen | 73—201 X |
| 3,173,295 | 3/1965 | Magleby | 73—201 |
| 3,187,570 | 6/1965 | Mueller | 73—201 |

RICHARD C. QUEISSER, *Primary Examiner.*

EDWARD D. GILHOOLY, *Assistant Examiner.*